United States Patent [19]

Tamirisa

[11] Patent Number: 5,784,613
[45] Date of Patent: Jul. 21, 1998

[54] EXCEPTION SUPPORT MECHANISM FOR A THREADS-BASED OPERATING SYSTEM

[75] Inventor: Gopala Chary Tamirisa, Austin, Tex.

[73] Assignee: International Busines Machines Corporation, Armonk, N.Y.

[21] Appl. No.: 527,046

[22] Filed: Sep. 12, 1995

[51] Int. Cl.$^6$ ..................................................... G06F 9/00
[52] U.S. Cl. .......................................... 395/670; 395/670
[58] Field of Search ....................................... 395/670, 678

[56] References Cited

U.S. PATENT DOCUMENTS

| | | |
|---|---|---|
| 5,197,138 | 3/1993 | Hobbs et al. . |
| 5,305,455 | 4/1994 | Anschuetz et al. ............... 395/670 |
| 5,348,588 | 9/1994 | Winston . |
| 5,404,529 | 4/1995 | Chernikoff et al. . |
| 5,418,956 | 5/1995 | Willman . |
| 5,432,933 | 7/1995 | Janick . |
| 5,481,719 | 1/1996 | Ackerman et al. ............... 395/678 |

OTHER PUBLICATIONS

Doug moen, A Disipline of Error Handling, USENIX Assoc., pp. 123–133, Jun. 12, 1992.
Brian Bershad, David Redell, John Ellis Fast Mutual Exclusion for Uniprocessors, The SOM Toolkit User's Guide, pp. 12-1 to 12-8, May 1993.

*Primary Examiner*—Alvin E. Oberley
*Assistant Examiner*—Steve Rosenholm
*Attorney, Agent, or Firm*—Jeffrey S. LaBaw; David H. Judson

[57] ABSTRACT

A method is disclosed for providing exception support in a computer having an operating system, the operating system providing application programming interfaces for use by a threads library to create, execute and cancel process threads. The threads library normally maintains a cleanup handler stack for each thread for use in effecting clean-up of state upon receipt of a thread cancel. The method begins when there is a predetermined exception handling macro associated with a current thread by pushing a pair of pointers onto the cleanup handler stack of that thread. The first pointer identifies a predetermined function and the second pointer identifies a particular exception context. Upon receipt of a thread cancel for the thread, the threads library invokes the predetermined function as a cleanup handler (with the exception context as its argument) to thereby map the thread cancel into an exception. The exception is then processed using an exception handling mechanism. The method advantageously enables the operating system to provide exception support for applications written to conform to the Distributed Computing Environment (DCE) standard even though the threads library does not otherwise support any mechanism for raising exceptions.

20 Claims, 4 Drawing Sheets

EXCEPTION SUPPORT MECHANISM FOR A THREADS-BASED OPERATING SYSTEM

TECHNICAL FIELD

The present invention relates generally to operating systems providing multi-threaded programming interfaces and more particularly to a method that enables such an operating system to provide exception support for applications written to conform to the Distributed Computing Environment (DCE) standard.

BACKGROUND OF THE INVENTION

It is well known in the art to interconnect multiple computers into a local area network (LAN) to enable such computers to exchange information and share resources. A local area network provides a distributed computing environment in which users can access distributed resources and process applications on multiple computers.

A known distributed computing environment, called DCE, has been implemented using software available from the Open Systems Foundation (OSF). In a distributed computing environment, a group of machines is typically referred to as a "domain." An OSF DCE domain is called a "cell." A DCE cell can be a complex environment involving hundreds of machines in disparate locations throughout the world.

The OSF DCE software has a known exception handling mechanism for transferring control to specified execution paths in an application when so-called "exceptions" arise. An "exception" is any unexpected event that the operating system can convey to the application and that the application must then handle in order to continue its processing. One such exception, for example, might arise when the application makes an improper memory access. This is a so-called "internal" exception as it is inflicted by the application itself. Another example, a so-called "external" exception, might occur when one thread of a multi-threaded application process seeks to cancel the processing of a currently-executing thread.

An exception mechanism enables error information to be returned across multiple levels of procedure calls and thus allows an application to handle an error at the level where the proper recovery actions are known. A function that detects the error originally "raises" the exception. The exception automatically propagates through multiple procedure frames (i.e. through nested function calls) until it is said to be caught. Once the exception is caught, it can be "reraised." This mechanism allows a procedure to intercept an exception and restore state (for example, by releasing a resource) even if the procedure does not know how to fully recover from the error condition. Intermediate functions that do not need to release resources can ignore the exception. Without this mechanism, each nested function, in response to the error information, would have to clean up its state and try to pass the error back to the application. This would require checking, managing, and returning an error status through a number of function calls, which is inefficient and error prone.

Thus, once an exception is raised, it automatically propagates through any nested function calls until it is caught. Any function along the way can catch it, either specifically by name, or by a CATCH ALL handler. When the exception reaches the level where the proper recovery actions are known, the appropriate error handling code is implemented. Intermediate functions which do not need to release resources ignore the exception. When an error condition occurs, and no action can be taken to recover from the error, the application usually must terminate rather than continuing to execute with incorrect (and possibly unpredictable) results.

The problem of exception handling in a multi-threaded programming environment is particularly acute if a developer desires to write DCE-based applications for current multi-threaded operating systems that do not support the DCE exception handling mechanism. One such operating system is IBM's AIX (Advanced Interactive Executive) operating system, which is compatible at the application interface level with AT&T's UNIX operating system, version 5.2. The AIX operating system Release 4.1 provides interfaces by which a POSIX threads-based library can create, execute and cancel threads in a process. POSIX is a series of standards for applications and user interfaces to open systems, issued by the Institute of Electrical and Electronics Engineers Inc. (IEEE). The IEEE POSIX.1c is the emerging standard for user level multi-threaded programming. DCE, which is based on the older draft 4 of POSIX.1c, utilizes the threads features extensively.

POSIX.1c provides a mechanism for thread cleanup after cancellation through the pthread_cleanup_push( ) and the pthread_cleanup_pop( ) functions. When a thread gets canceled, these pushed handlers are invoked in a Last-In-First-Out (LIFO) fashion. While POSIX.1c theoretically allows an exception mechanism to be implemented over this cleanup handling, it does not specify any exception handling mechanism itself, leaving such support to the programming language.

To address this problem, earlier versions of the AIX operating system (AIX DCE 1.2) provided support for the pthread_cleanup_push( ) and pthread_cleanup_pop( ) functions and, in addition, attempted to integrate the thread cancel and the exception support under a single implementation. In particular, in AIX DCE 1.2, a certain limited number of UNIX signals were converted to exceptions, and a signal handler installed by the threads library raised an exception whenever these signals were delivered to a process being executed. These exceptions were then handled within an application in an exception handling macro.

A new draft 7 of POSIX.1c has now been issued, yet this draft still does not specify any exception mechanism for the threads library. Thus, many threads-based operating systems including, without limitation, recent implementations of the AIX operating system (Release 4.0 and higher), do not support an exception handler. This remains a significant problem because, without adequate exception support in the multi-threaded operating system environment, DCE must be completely rewritten.

BRIEF SUMMARY OF THE INVENTION

It is therefore a principal object of the invention to port DCE to an operating system having kernel support for threads-based multi-programming.

It is still another object of the invention to implement portable exception support in a computer having an operating system with application programming interfaces to a threads-based library.

It is another important object of the invention to interface an exception support mechanism to a conventional pthreads library, i.e. a library that does not provide any mechanism for raising exceptions, so as to facilitate a port of DCE to the AIX operating system.

It is yet another more specific object to support exceptions in a threads-based operating system conforming to the POSIX.1c standard. This enables the threads-based operating system to take full advantage of existing DCE exception handling mechanisms without a DCE rewrite.

It is a more particular object of the invention to map thread cancels to exceptions for handling by an exception handling mechanism, preferably a known DCE mechanism using TRY/CATCH/ENDTRY macros. By "catching" a thread cancel as an exception, the present invention enables the exception to be corrected so that the currently-executing thread is not canceled.

These and other objects of the invention are implemented in a method for providing exception support in a computer having an operating system, the operating system providing application programming interfaces for use by a threads library to create, execute and cancel threads in a process. The threads library normally maintains a cleanup handler stack for each thread for use in clean-up or restore of invariant state (e.g., by releasing resources or mutexes) upon receipt of a thread cancel. The method begins when there is a predetermined exception handling macro (e.g., a TRY macro) associated with the current thread. If so, the method pushes a pointer to a "sentinel" function, along with a pointer to an exception context, in the cleanup handler stack of the thread. The exception context has been previously saved and contains at least two elements: a jump buffer having machine state information, and an exception state defining the type of exception (e.g., a cancel exception, a signal exception, an application-defined exception, etc.). Upon receipt of a thread cancel for the thread, the threads library invokes the sentinel function as a cleanup handler to thereby map the thread cancel into an exception. The exception is then processed using an exception handling mechanism. Such processing typically includes "jumping" through the exception context to handle the exception without canceling the thread.

The above-described method advantageously enables the operating system to provide exception support for applications written to conform to the Distributed Computing Environment (DCE) standard even though the operating system threads library does not otherwise provide support for raising exceptions.

Preferably, the invention is implemented in a known computer running an AIX operating system and having a threads library, the threads library maintaining a cleanup handler stack for each thread identifying cleanup handlers for use in cleaning-up thread specific data upon receipt of a thread cancel. In particular, the invention enables a DCE exception handling mechanism to be used even though the operating system normally would not support this mechanism. One such known DCE exception handling mechanism is used to transfer control to specified execution paths (known as CATCH blocks) when exceptions arise. This is achieved by mapping a thread cancel into an exception and jumping through the specified execution paths.

One particular object of the invention is to emulate POSIX.1c draft 4 over an AIX Release 4 pthreads library, thereby meeting the requirements of a DCE exception mechanism. This facilitates the porting of DCE to AIX Release 4 without rewrite.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
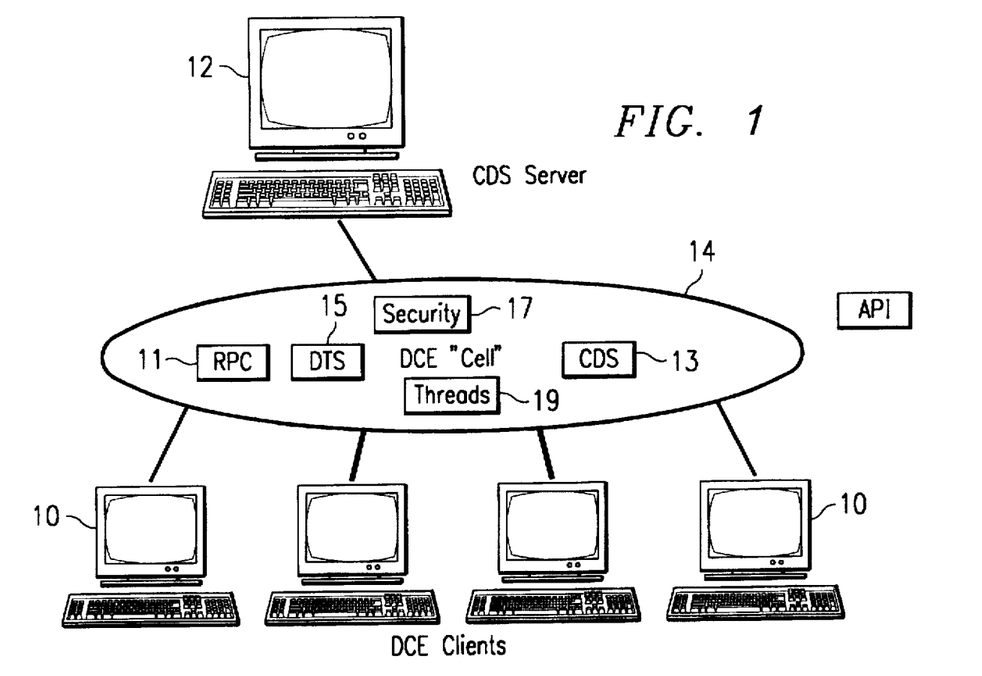
FIG. 1 illustrates a known computer network in which the present invention is implemented.

As described above, the invention is directed generally to handling exceptions in a computer operating system having application programming interfaces through which a POSIX-based threads library provides multi-threaded programming support. As shown in FIG. 1, preferably the computer is located in a local area network providing a distributing computing environment in which users can access distributed resources and process applications on multiple computers. The distributed computing environment includes clients 10 interconnected to servers 12 via a network 14. Each of the clients 10 and servers 12 is a computer. For example, each computer may be an IBM® RISC System/6000® (a reduced instruction set or so-called RISC-based workstation) running the AIX (Advanced Interactive Executive) operating system. The AIX operating system is compatible at the application interface level with AT&T's UNIX operating system, version 5.2. The various models of the RISC-based workstation computers are described in many publications of the IBM Corporation, for example, RISC System/6000, 7073 and 7016 POWERstation and POWERserver Hardware Technical Reference, Order No. SA23-2644-00. The AIX operating system is a multi-user, multi-tasking operating system and is further described in *AIX Operating System Technical Reference, Order No.*, published by IBM Corporation, First Edition (November, 1985), and other publications.

In one particular implementation, the distributed computing environment runs a plurality of IBM RISC System/6000 interconnected by IBM's System Network Architecture (SNA), and more specifically SNA LU 6.2 Advanced Program to Program Communication (APPC). SNA uses as its link level Ethernet, a local area network (LAN) developed by Xerox Corporation, or SDLC (Synchronous Data Link Control). A simplified description of local area networks may be found in a book by Larry E. Jordan and Bruce Churchill entitled *Communications and Networking for the IBM PC*, published by Robert J. Brady (a Prentice-Hall Company)(1983). Although the invention is described in the above-identified context, it should be appreciated that the teachings herein may be implemented using other and different computers than the IBM RISC-based PC's interconnected by other networks than the Ethernet LAN or IBM's SNA.

Each of the clients 10 and servers 12 may operate as a client or server, depending on whether it is requesting or supplying services. Typically, the client includes at least one process that requests a service from a server process using a remote procedure call (RPC). As is well known, a "client" refers to a network participant that is requesting a service accessible somewhere within the computing environment. A "server" provides the requested service to a client. An OSF DCE system includes several subsystems including a remote procedure call (RPC) mechanism 11, a cell directory service (CDS) 13, a distributed time service (DTS) 15 and a Security Service 17. DCE also has associated therewith a transaction-based application programming interface (API), as well as a multi-thread service, known as DCE Threads 19. As is known in the art, threading allows multiple routines conceptually to run simultaneously and to share resources. The DCE Threads service is a set of routines that can be used to create a multi-threaded program. Multi-threading is used to improve the performance of a program by allowing pieces of the program to operate concurrently. DCE Threads is a user-level (nonkernel) threads package based on the pthreads interface specified in "Draft 4 of the POSIX 1003.4a Standard," which is incorporated herein by reference. The POSIX 1003.4a Standard is also referred to as POSIX.1c.

Figure 2:
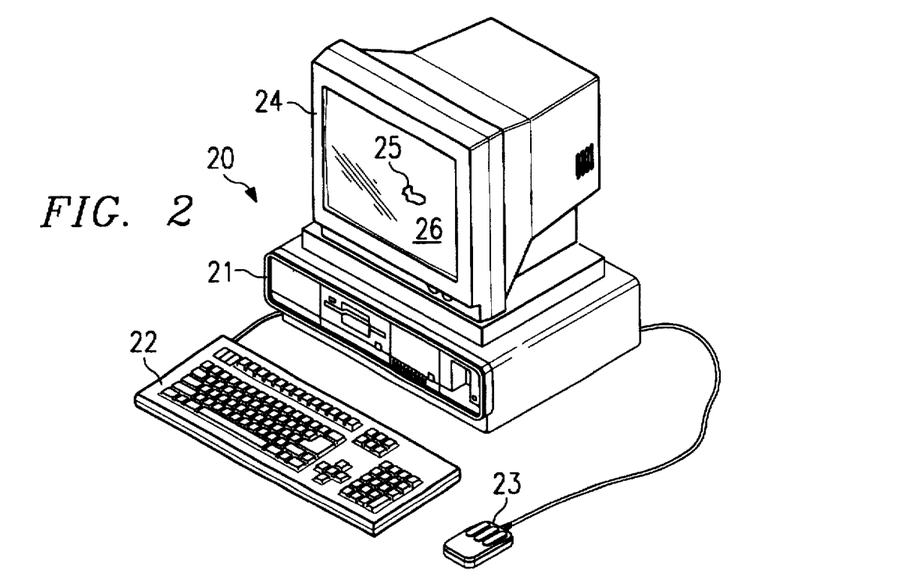
FIG. 2 illustrates a computer in which the present invention is implemented.
Figure 3:
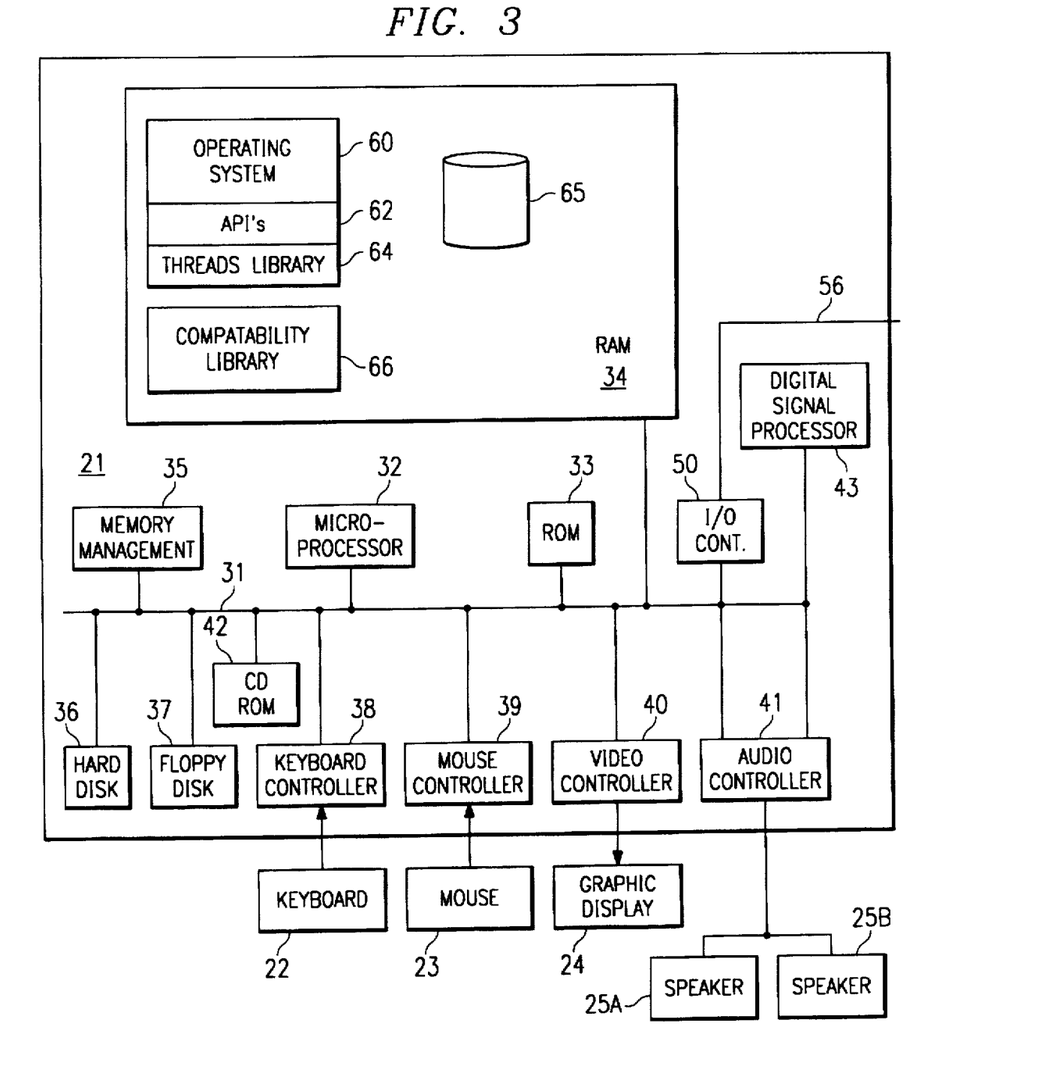
FIG. 3 is a block diagram of the computer of FIG. 2.

A representative computer in which the invention is implemented is shown in FIGS. 2–3. A computer 20, comprising a system unit 21, a keyboard 22, a mouse 23 and a display 24 are depicted in FIG. 2. The screen 26 of display device 24 is used to present the graphical user interface (GUI). The graphical user interface supported by the operating system allows the user to use a point and shoot method of input, i.e. by moving the mouse pointer 25 to an icon representing a data object at a particular location on the screen 26 and pressing on the mouse buttons to perform a user command or selection.

FIG. 3 shows a block diagram of the components of the personal computer shown in FIG. 2. The system unit 21 includes a system bus or plurality of system buses 31 to which various components are coupled and by which communication between the various components is accomplished. The microprocessor 32 is connected to the system bus 31 and is supported by read only memory (ROM) 33 and random access memory (RAM) 34 also connected to system bus 31. A microprocessor in Motorola's family of microprocessors, such as the 68000, 68020 or the 68030 microprocessors, or various RISC microprocessors manufactured by IBM, Hewlett Packard, Sun, Intel, Motorola and others, may be used in the specific computer.

The ROM 33 contains among other code the Basic Input-Output system (BIOS) which controls basic hardware operations such as the interaction and the disk drives and the keyboard. The RAM 34 is the main memory into which the operating system and application programs are loaded. The memory management chip 35 is connected to the system bus 31 and controls direct memory access operations including, passing data between the RAM 34 and hard disk drive 36 and floppy disk drive 37. The CD ROM 42, also coupled to the system bus 31, is used to store a large amount of data, e.g., a multimedia program or large database. Also connected to this system bus 31 are various I/O controllers: the keyboard controller 38, the mouse controller 39, the video controller 40, and the audio controller 41. The keyboard controller 38 provides the hardware interface for the keyboard 22, the mouse controller 39 provides the hardware interface for the mouse 23, the video controller 40 is the hardware interface for the display 24, and the audio controller 41 is the hardware interface for the speakers 25a and 25b. An I/O controller 50 such as a Token Ring Adapter enables communication over a network 56 to other similarly configured data processing systems.

RAM 34 supports the operating system kernel 60 which provides application programming interfaces (API's) 62 by which a threads library 64. A threads library provides the general capability of creating threads, synchronizing threads, supporting thread-specific data and canceling threads. As seen in the figure, the operating system may not support the threads library 64 directly but rather provides a set of interfaces (the API's) to enable the library to implement multi-threading. As is known in the art, multi-threading involves breaking a process, which is a monolithic unit, into multiple instruction sequences which are then carried out in parallel. Preferably, the threads library 64 is based on the POSIX.1c standard. According to this standard, the threads library maintains a cleanup handler stack, one of which is shown as reference numeral 65, for each thread of the process. Each cleanup handler stack maintains certain information, which typically includes pointers to one or more cleanup handler functions or "handlers." The one or more cleanup handlers are invoked by the threads library whenever a currently-executing thread receives a "thread cancel." A thread cancel may arise from some event that occurs within the thread itself, or from some external event such as another thread issuing a request for cancellation. These handlers are used clean-up or "restore" state (e.g., release mutexes, free-up memory, reset environment variables, release resources, etc.) upon receipt of a thread cancel.

A cleanup handler stack may be thought of more generally as simply a memory area having allocated portions that are linked together to form the stack structure. Conceptually, any type of internal structure maintained in LIFO order may be used for this purpose, and other similar types of known structures (e.g., a lookup table) could implement the cleanup handler stack according to the invention.

RAM 34 also supports a compatibility library 66 where the functions comprising the present invention reside. As will be seen, the inventive exception support mechanism comprises a plurality of functions which treat thread cancels as exceptions, thereby integrating the threads library 64 with a known DCE exception handling mechanism. DCE provides this mechanism (as shown in FIG. 1) to transfer control to specified execution paths in the application when exceptions arise. A brief summary of the DCE exception handling mechanism is set forth below as further background to the present invention.

DCE includes a set of macros (supported in the DCE threads library 19 of FIG. 1) that allow a programmer to define a block of code (an "exception scope") wherein exceptions may be caught, as well as code within the block to be used to process one or more exceptions. A RAISE macro is used for raising an exception, which effects a backwards search through all active scopes which have declared an interest in catching exceptions. The TRY macro defines the beginning of the exception scope and the ENDTRY macro defines the end thereof. More particularly, a left {brace defines the start of the exception scope and the right} brace defines the end thereof. The exception scope can identify what specific exceptions it is interested in by naming them in a CATCH macro. When an exception reaches the block, control is transferred to the first CATCH clause in the block that matches the exception. The exception scope can express interest in all exceptions (rather than specific ones) using the CATCH_ALL macro. A FINALLY macro catches an exception and then reraises it for handling by other blocks. Any exception raised within a block, or within any functions that are called by the code therein, are either caught (and reraised if it is desired to continue propagation) or ignored. Reraising the exception allows other blocks (which are typically nested) an opportunity to perform error recovery.

The { ...} structure introduced by the TRY block is recognized by the compiler and is used to raise exceptions. The first element within this structure (following the left { brace) is a local variable defining the "exception context," which in turn comprises at least two elements: a jump buffer of approximately 64 bytes of machine state information, and an exception state identifying the type of exception. An exception may be of several types: a cancel exception, a signal exception, a user-defined exception, etc.). An exception context is said to be valid as long as the code being processed is within the exception scope defined by the left and right { ....} braces introduced by the TRY macro and terminated by the ENDTRY macro. The TRY macro thus introduces a local structure called the exception context which contains the jump buffer and the exception state. A function called setjump( ) is called by the TRY macro as well and is used to save or "fill" the current machine state information in the jump buffer. The exception context information is used by a longjumping function, longjump( ). The setjump( ) function thus allows for the saving of an exception context, and the longjump( ) function faciliates a jump to that exception context where appropriate exception handling code is provided.

An exception gets generated, among other reasons, when a thread is canceled by another thread, or when a select list of UNIX synchronous terminating signals are delivered to a process. The exceptions thus raised can be caught by an application using the TRY/CATCH/ENDTRY macros, or the TRY/FINALLY/ENDTRY macros. In most cases, when a cancel exception is received, the application releases the resources held by the canceled thread in the CATCH macro or the FINALLY macro. The implementation of exceptions ensures that any mixture of thread cancel handlers and the TRY blocks results in the LIFO-order invocation of the corresponding handling code.

Figure 4:
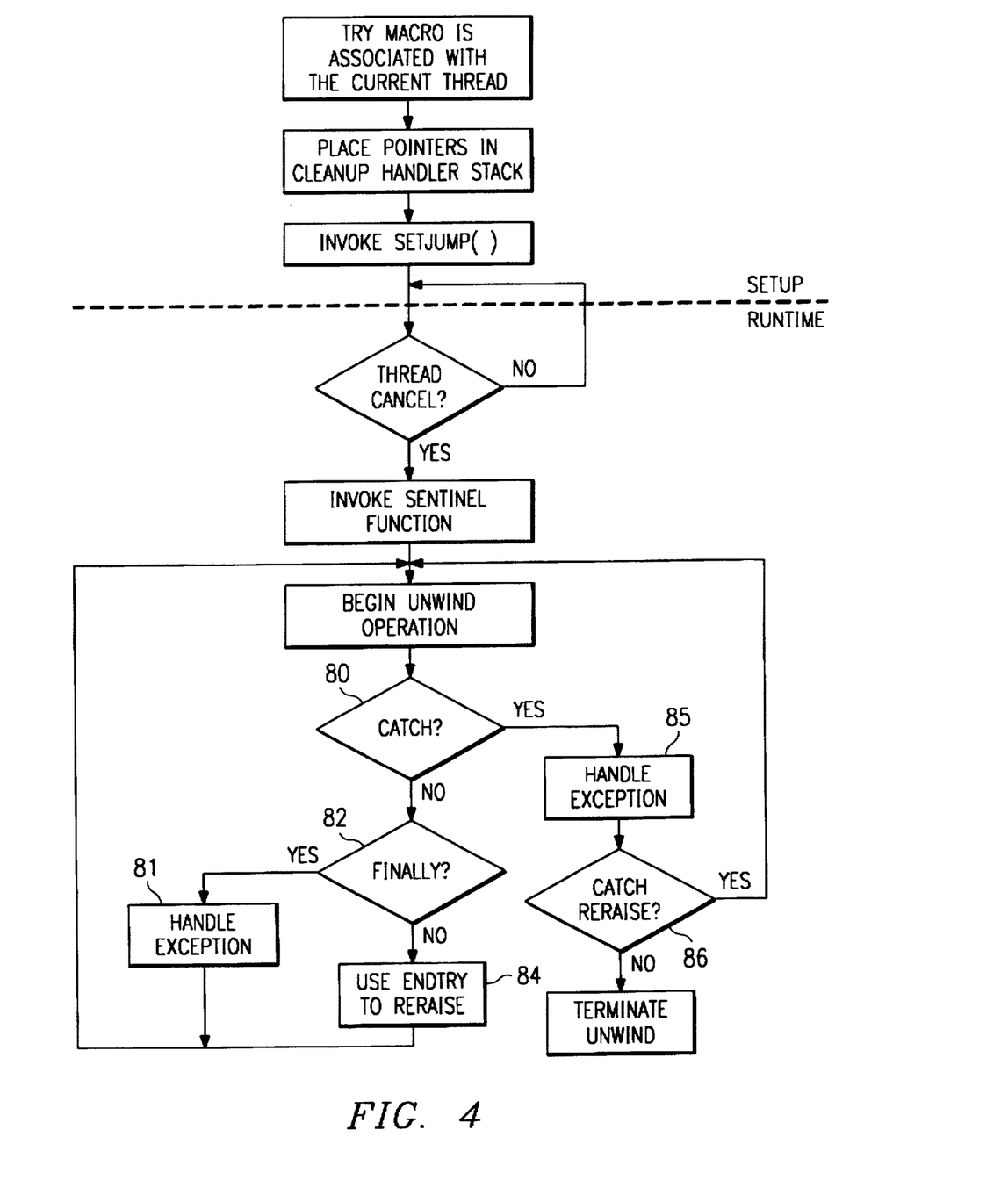
FIG. 4 illustrates a preferred method for providing exception support according to the present invention.

Referring now to FIG. 4, a flowchart is shown of a preferred method of the present invention. The portion of the flowchart above the dotted line occurs during a setup operation and the portion below occurs during a runtime operation. The method is carried out in a computer having an operating system providing API's for use by the threads library to create, execute and cancel threads, and the threads library maintains a cleanup handler stack (or some such equivalent structure) for each process thread being executed. According to the method as illustrated in FIG. 4, it is assumed that the appropriate number of threads has been identified and each thread has an associated cleanup handler stack having pointers to thread cancellation handlers (e.g., pthread_cleanup_push( ) and pthread_cleanup_pop( ) API in the POSIX.1c draft 4 standard). These cleanup handlers are normally invoked in LIFO order when a thread receives a cancel. According to the invention, when a pointer to some saved exception context exists in the cleanup handler stack, a predetermined "sentinel" function (also identified by a pointer in the stack) is invoked as if it were another cleanup handler. This preserves the order in which the application invokes pthread_cleanup_push and the TRY blocks. When the sentinel function is invoked as a handler, it performs a longjump into the exception context.

According to the invention, if there is a TRY block in the current thread, a thread cancel received by that thread is "mapped" to an exception. This is achieved by pushing the sentinel function pointer onto the cleanup handler stack along with a pointer to the exception context (which occurs during setup), and then invoking the sentinel function as a cleanup handler (which occurs during runtime). If there is no TRY block in the current thread, any thread cancel results in cancellation of the thread. The flowchart illustrates the inventive technique with respect to a single process thread, although it should be appreciated that the same processing occurs for each thread.

Figure 5:
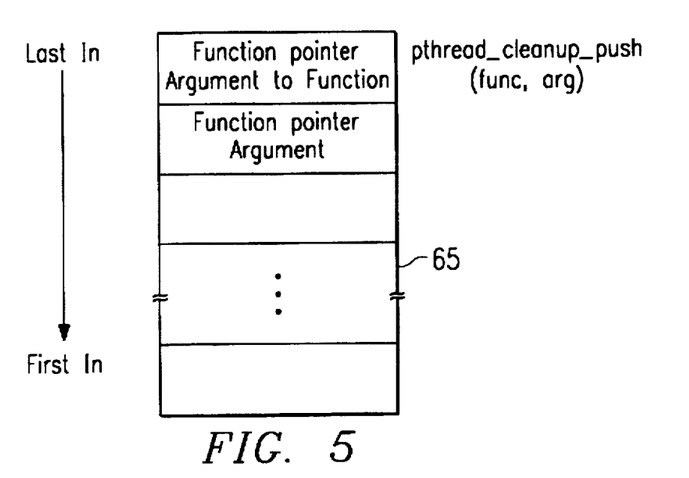
FIG. 5 is an illustration of the cleanup handler stack showing how the sentinel function and exception context pointers are pushed.

In step 70, it is assumed that there is a TRY associated with the current thread. The method continues at step 72 and places a pointer to a predetermined "sentinel" function and a pointer to the exception context in the cleanup handler stack. In particular, and as illustrated in FIG. 5, the routine pthread_cleanup_push( ) of the pthreads library passes two pointers (func, arg), the first identifying the sentinel function and the second the exception context. The function is called a "sentinel" because it watches for thread cancels. The sentinel function thus has an argument associated therewith defining the exception context in which the specified exception is to be handled. The sentinel function is responsible for generating a cancel exception when invoked, thus completing the mapping of the thread cancel to an exception (if a TRY block is associated with the current thread). Information defining each exception context is stored in a structure that includes the jump buffer. In step 74 (which is also part of the setup routine), the setjump( ) function is invoked, which opens the exception context.

As noted above, the exception context is defined in the block in which the TRY macro is introduced, and that context is considered valid during the time the TRY macro is within the exception scope (the block of code between the TRY and ENDTRAY macros). The pointer (and associated exception context argument and/or information) may be represented in the cleanup handler stack as a linked list, as an array, or in some other data structure. Alternatively, a separate exception context stack may be maintained in association with the cleanup handler stack for storing a linked list of pushed exceptions. In such case, the second pointer (arg) illustrated in FIG. 5 would point to the exception context stack. Preferably, only the single stack (i.e. the cleanup handler stack) is used, and as previously noted the cleanup handler stack may be implemented in various known ways.

The runtime operation is now described. A test is performed at step 75 for receipt of a thread cancel for the thread. If a thread cancel is received, the threads library invokes the sentinel function as a cleanup handler to thereby complete the mapping of the thread cancel into an exception. This is illustrated at step 76. The method continues by processing the exception using an exception handling mechanism. An example of this process (which invokes an exception raising function) is shown in the remainder of the flowchart. At step 78, an unwind operation is begun. At step 80, a test is performed to determine whether a CATCH (or a CATCH_ALL) macro is encountered. If the outcome of the test at step 80 is negative, another test is performed at step 82 to determine whether a FINALLY macro is encountered. If the outcome of the test at step 82 is positive, the exception is handled at step 81 and the routine returns as shown. If the outcome of the test at step 82 is negative (meaning that the exception has not been handled through a CATCH macro or any FINALLY macro), the exception handling mechanism continues at step 84 to use the ENDTRY macro to reraise the exception. If the outcome of the test at step 80 is positive (meaning that a CATCH or CATCH_ALL macro was encountered), the routine handles the exception at 85 and then performs a test at step 86 to determine whether the CATCH macro reraises the exception. If the result of the test at step 86 is negative, the routine terminates the unwinding operation at step 88. If the result of the test at step 86 is positive, the routine returns as shown. When the DCE exception catching macros are used, processing of the exception typically involves longjumping through the saved exception context and propagating the exception as may be necessary.

In the preferred embodiment, the above-described method is implemented in DCE over an AIX 4.1 (or higher) operating system having a pthreads library, which normally does not include any mechanism for raising exceptions. When a thread is canceled, theAIX 4.1 pthreads library invokes a function pthread_exit( ) to do the thread exit time cleanup operation. As part of the cleanup, all the cleanup handlers pushed on the cleanup stack are invoked in a LIFO order. In order to map thread cancel to exception, a pointer to __dce_exception_sentinel_func( ) (i.e. the sentinel function) is pushed on this cleanup stack whenever a TRY block is used in the application. When the function is invoked as a cleanup handler, it has the exception as an argument. The exception handler provides the functionality of raising exceptions by performing a_longjmp( ) into the jump buffer included in the context. In the preferred embodiment, the exception raised by the method is the "cancel" exception, although the technique may be used as well to map "signals" into exceptions or other events into exceptions.

The exception mechanism described in detail below is preferably implemented as part of a compatibility library that is used to port AIX DCE to AIX 4, although it will be appreciated by one of ordinary skill in the art that the technique is useful to provide portable exception support for any multi-user, multi-tasking operating system. AIX 4 provides kernel support for threads, as well as a pthreads library based on POSIX.1c draft 7. The compatibility library provides emulation of POSIX.1c draft 4 over the AIX4 pthreads library, although the invention should not be construed to be limited to this embodiment.

The exception part of the compatibility library is provided through two files: a header file (<exc_handling.h>) and a C language file (dce_exception.c) containing the implementing functions. The <exc_handling.h> header file defines the following macros: TRY, CATCH, CATCH_ALL, FINALLY and ENDTRY. The dce_exception.c file provides external interfaces: exc_pop_ctx( ), exc_push_ctx( ), exc_raise( ), exc_raise_status( ) and exc_report( ). In addition, the exception file provides the following internal functions: void_dce_exc_sentinel_func(void), void_ dce_exc_sentinel_pop(void).

As noted above, the TRY macro opens the exception scope and declares the exception context structure. Within that structure there is a jump buffer and an exception state. By invoking the exc_push_ctx( ) function, the TRY macro also pushes to the cleanup handler stack a pointer to the sentinel function (__dce_exc_sentinel_func( )) and a pointer to the exception context information. The TRY macro also does the setjmp( ) functionto fill the exception context jump buffer, and it starts a block of statements to be guarded by the TRY clause. The block is ended by a following ENDTRY macro. The ENDTRY macro: pops the exception context if no exception is present or if an active exception is present by invoking exc_pop_ctx( ). This includes the popping of the sentinel function.

The main functions in exception.c are: (i) the function __dce_exc_sentinel_func( ) that maps cancels to exceptions, (ii) the function __dce_exc_sentinel_pop( ) that pops the above mapper from the cleanup handler list, (iii) the function exc_push_ctx that pushes an exception context (invoked by the TRY macro), (iv) the function exc_pop_ctx( ) that pops an exception context (invoked by ENDTRY and FINALLY macros), and (v) the function exc_raise( ) that raises exceptions. Each of these functions is described below.

Map Cancel to Exception (__dce_exc_sentinel_func( ))

The (__dce_exc_sentinel_func( )) provides the mapping of cancel to exception. As discussed above, a pointer to the sentinel function is pushed onto the cleanup handler stack by the use of pthreads_cleanup_push( ). That function also pushes another pointer onto that same stack pointing to the current exception stack. There is thus a sentinel function pointer and the exception context pointer, both of which are passed by the pthreads_cleanup_push( ) function upon invocation of a TRY macro. When a thread cancel arrives for the thread, the function pthread_exit( ) is invoked by the pthreads library. The pthread_exit( ), in turn, invokes a thread cleanup unwind operation. The cleanup unwinder removes the handlers from the cleanup stack and invokes them in a LIFO (last in, first out) fashion. Thus, the sentinel function, pushed on the cleanup handler list by the TRY block, gets invoked like any other cleanup handler. The sentinel function performs a longjmp( ) into the last TRY block where it enters a CATCH, or CATCH_ALL or a FINALLY clause. The function and arguments are set forth below:

void_dce_exc_sentinel_func(exc_context_t*ctx)

Do a longjmp( ) to the context contained in ctx. If there is no exception context, the sentinel function invokes pthread_exit( ) to terminate the thread.

Pop the cleanup handler (__dce_exc_sentinel_pop( ))

In order to maintain the order of TRY blocks and pthread_cleanup_push( ) blocks, it is important to gain control of the cancel cleanup handler invocation from the exception handler mechanism. The function __dce_exc_ sentinel_pop( ) provides this functionality. Whenever exc_ raise( ) is called to raise an exception, the sentinel pop function is invoked in the compatibility library. The sentinel pop function pops the cleanup handlers from the cleanup handler stack and invokes them until it is empty or it comes across the __dce_exc_sentinel_pop( ) function.

Pushing an Exception Context (exc_push_ctx( ))

The function invokes pthread_cleanup_push(__dce_ exc_sentinel_func, ctx, self) to push the sentinel function with the associated context pointer. Note that the context is valid as long as within the scope of the storage block opened by the outermost TRY block.

Popping an Exception Context (exc_pop_ctx( ))

If no exception is raised, then invoke pthread_cleanup_ pop_np(O,self) to pop the sentinel function. If there is an active unhandled exception, invoke exc_raise(ctx→cur_ exception). Mark the exception as exc_popped_c.

Raising an Exception (exc_raise( ))

If an exception context is present, a call to exc_raise( ) will result in transfer of control to the innermost block that can receive the exception. If a CATCH( ) block does not exist for this exceptionk the exception is reraised to the next higher level if one exists. Otherwise it is treated as an unhandled exception.

If exc_raise( ) is called but there is no exception block within the scope, then it is treated as an unhandled exception.

The exc_raise( ) calls __dce_exc_sentinel_pop( ). This is done so that all the cleanup handlers pushed on the cancel cleanup stack are invoked before unwinding the exception contexts. This preserves the order between cancel cleanup handlers and the TRY blocks. The _dce_exc_sentinel_ pop( ) returns a pointer to the innermost exception context. Then, if the context is non-null value, a long jump is made to that context. This starts unwinding the TRY blocks. If a CATCH exists, the exception unwinding stops unless the CATCH reraises the exception. A FINALLY if present will cause an automatic reraise of the exception. If the exception is not handled either through a CATCH or through FINALLY, the ENDTRY will reraise it.

Unhandled Exceptions

If an exception is active (or raised) and there is no exception context to handle exceptions, the following rules apply:

If it is a cancel exception, the thread exits through a call to pthread_exit( ).

If it is SIGPIPE exception, it terminates the process.

If it is a SIGSYS exception, or any other exception, it creates a core dump and terminates the process.

Figure 6:
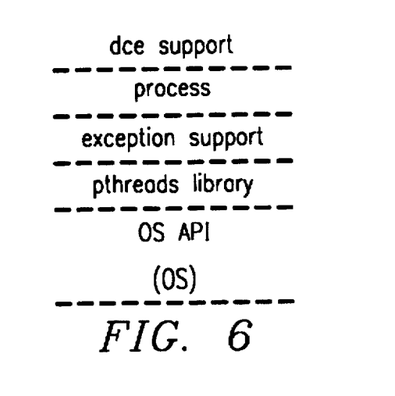
FIG. 6 is an illustration showing how the exception support mechanism interfaces to the pthreads library.

The design described above emulates the AIX DCE 1.2 exceptions/cancellation behavior on a POSIX.1c compliant pthreads library in AIX 4.1. This is illustrated in FIG. 6, which is a representation of the relationship between the exception support mechanism and the pthreads library. As seen in this drawing, the operating system is at the lowest level, with the pthreads library sitting directly on top of the operating system. As noted, the operating system provides the API's by which the threads library facilitates the threads service. Normally, the application process sits directly on top of the pthreads library so that the pthreads library can "see" the OS API's and used them to emulate the behavior of the POSIX multi-threaded model while at the same time shielding the application from these primitives. The present invention places the exception layer between the application and the pthreads layer. This layer provides the DCE application, on the one hand, and the pthreads library, on the other hand, with the syntax and semantics that each expects to see. The exception mechanism and the thread cleanup mechanism are interwoven in a seamless fashion; thus meeting with the requirements of the DCE exception package even though the pthreads library does not normally include a mechanism for raising exceptions. This facilitates the process of porting DCE to AIX 4.1.

One of the preferred implementations of the exception support mechanism of the invention (including, without limitation, the header file <exc_handling.h>, the C language file dce_exception.c, and the DCE exception handling mechanism) is as a set of instructions in a code module resident in the random access memory 34 of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred embodiment in a specific operating system and network environment, those skilled in the art will recognize that the invention can be practiced, with modification, in other and different operating systems and network architectures with the spirit and scope of the appended claims. The present invention, however, is not to be construed as limited to the DCE architecture and thus in a more general sense the invention should be broadly construed to cover any network.

Having thus described my invention, what I claim as new and desire to secure by Letters Patent is set forth in the following claims:

1. A method for providing exception support in a computer having an operating system, the operating system providing application programming interfaces for use by a threads library to create, execute and cancel threads in a process, the threads library maintaining a cleanup handler stack for each thread for effecting clean-up of state upon receipt of a thread cancel, and wherein the threads library does not support a mechanism for raising exceptions, comprising the steps of:

placing a pointer in the cleanup handler stack of a thread pointing to a predetermined function;

upon receipt of a thread cancel for the thread, having the threads library invoke the predetermined function as a cleanup handler while continuing operation of the thread;

generating an exception during execution of the said predetermined function;

processing the said execution using an exception handling mechanism; and allowing the thread to continue operation unless the exception cannot be handled.

2. The method as described in claim 1 wherein the step of placing a pointer to the predetermined function also places a pointer to an exception context such that upon receipt of the thread cancel, the predetermined function performs a jump into the exception context.

3. The method as described in claim 2 wherein the jump into the exception context is performed using a longjump function.

4. The method as described in claim 3 wherein the exception handling mechanism includes exception catching macros.

5. The method as described in claim 4 wherein the exception catching macros include a TRY macro, one or more CATCH macros, a FINALLY macro and an ENDTRY macro.

6. The method as described in claim 5 wherein the pointer to the predetermined function is placed onto the cleanup handler stack when a TRY macro is invoked.

7. The method as described in claim 5 wherein after the jump into the exception context, the method performs the steps of:

unwinding TRY macro blocks until a CATCH macro is encountered;

if a CATCH macro is encountered, terminating the unwinding of TRY macro blocks and handling the exception unless the CATCH macro reraises the exception;

if the exception is not handled through a CATCH macro or any FINALLY macro, using the ENDTRY to reraise the exception.

8. A computer, comprising:

a processor;

an operating system including application programming interfaces;

a threads library to create, execute and cancel threads in a process using the application programming interfaces of the operating system, wherein the threads library does not support a mechanism for raising exceptions;

an exception handling mechanism for transferring control to specified execution paths when exceptions arise; and means, responsive to thread cancels, for mapping the thread cancels to exceptions without cancellation of the threads associated with the thread cancels to enable the exceptions to be handled by the exception handling mechanism;

wherein a given thread associated with a thread cancel exception is allowed to continue operating unless the exception cannot be handled.

9. The computer as described in claim 8 wherein the threads library maintains a cleanup handler stack for each thread for effecting clean-up of state upon receipt of a thread cancel.

10. The computer as described in claim 8 wherein the mapping means places a pointer to a sentinel function in the cleanup handler stack of a thread when a predetermined exception catching macro associated with the exception handling mechanism is invoked.

11. The computer as described in claim 10 wherein the mapping means also places a pointer in the cleanup handler stack pointing to an exception context when the predetermined exception catching macro associated with the exception handling mechanism is invoked.

12. The computer as described in claim 8 wherein the exception handling mechanism includes exception catching macros.

13. The computer as described in claim 12 wherein the exception catching macros include a TRY macro, one or more CATCH macros, a FINALLY macro and an ENDTRY macro.

14. The computer as described in claim 7 wherein the operating system is the AIX operating system.

15. In a computer running a multi-user, multi-tasking operating system and having a threads library that does not support a mechanism for raising exceptions, the improvement comprising:

an exception handling mechanism for transferring control to specified execution paths when exceptions arise; and means, responsive to a thread cancel and without cancellation of the thread associated with the thread cancel, for mapping the thread cancel into an exception and jumping through the specified execution paths;

wherein the thread associated with the thread cancel exception is allowed to continue operating unless the exception cannot be handled.

16. In the computer as described in claim 15 wherein the exception handling mechanism includes exception handling macros.

17. In the computer as described in claim 16 wherein the exception handling macros include a TRY macro, one or more CATCH macros, a FINALLY macro and an ENDTRY macro.

18. In the computer as described in claim 15 wherein the threads library maintains a cleanup handler stack for each thread identifying cleanup handlers for use in restoring state upon receipt of a thread cancel.

19. A computer program product in computer-readable media for use in a computer running an operating system and having a threads library, the threads library of the computer maintaining a cleanup handler stack for each thread identifying cleanup handlers for use in restoring state upon receipt of a thread cancel, the article of manufacture comprising:

code means for transferring control to specified execution paths when exceptions arise; and code means, responsive to a thread cancel and without cancellation of the thread, for mapping the thread cancel into an exception and jumping through the specified execution paths, wherein the thread associated with the thread cancel exception is allowed to continue operating unless the exception cannot be handled.

20. The computer program product as described in claim 19 wherein each of the code means comprises one or more instructions.

* * * * *